United States Patent
Falck

(10) Patent No.: US 10,059,143 B2
(45) Date of Patent: Aug. 28, 2018

(54) METHOD FOR CREATING A THREE-DIMENSIONAL EFFECT FROM A TWO-DIMENSIONAL WORK

(71) Applicant: Christopher Ernest Falck, Burke, VA (US)

(72) Inventor: Christopher Ernest Falck, Burke, VA (US)

( * ) Notice: Subject to any disclaimer, the term of this patent is extended or adjusted under 35 U.S.C. 154(b) by 214 days.

(21) Appl. No.: 15/275,468

(22) Filed: Sep. 25, 2016

(65) Prior Publication Data

US 2018/0086134 A1    Mar. 29, 2018

(51) Int. Cl.
*B44C 3/04*     (2006.01)
*B29C 39/02*    (2006.01)
*B29C 65/48*    (2006.01)
*B29C 65/00*    (2006.01)
*B29K 705/00*   (2006.01)

(52) U.S. Cl.
CPC .............. *B44C 3/048* (2013.01); *B29C 39/02* (2013.01); *B29C 65/48* (2013.01); *B29C 66/742* (2013.01); *B29K 2705/00* (2013.01)

(58) Field of Classification Search
CPC ......... B44C 3/048; B29C 39/02; B29C 65/48; B29C 66/742; B29K 2705/00
See application file for complete search history.

(56) References Cited

U.S. PATENT DOCUMENTS

| | | | |
|---|---|---|---|
| 2,005,719 A * | 6/1935 | Hayden | B44C 3/048 264/267 |
| 2,731,749 A | 1/1956 | Tarzian | |
| 3,057,099 A | 10/1962 | Fruchter | |
| 3,694,296 A | 9/1972 | Frontino | |
| 3,868,283 A | 2/1975 | Scheyer | |
| 5,470,410 A | 11/1995 | Keating | |

OTHER PUBLICATIONS

"From Steroscopy to Tactile Photography" Moritz Neumuller and Andreas Reichinger; PhotoResearcher No. 19 (2013).*
https://3dprint.com/102613/kickstarter-3dphotoworks/ (3DPhotoworks) (Oct. 27, 2015).*

* cited by examiner

*Primary Examiner* — Kevin R Kruer

(57) ABSTRACT

This is a method to alter a two-dimensional work into a three-dimensional version of that work, and then disguise it as a common two-dimensional work. The two-dimensional work must be malleable or made malleable by adhering a malleable backing, such as sheet metal, such that it retains the new shape when bent. Foreground elements of the work's subject matter are then moved physically closer to the viewer than background elements by sculpting techniques like bending, thus making the original work now three-dimensional. The work is then enclosed in a structure like a box with a window allowing the work to be seen. The window obscures the edges of the work such that viewing the art from multiple angles doesn't easily reveal the edge of work.

9 Claims, 2 Drawing Sheets

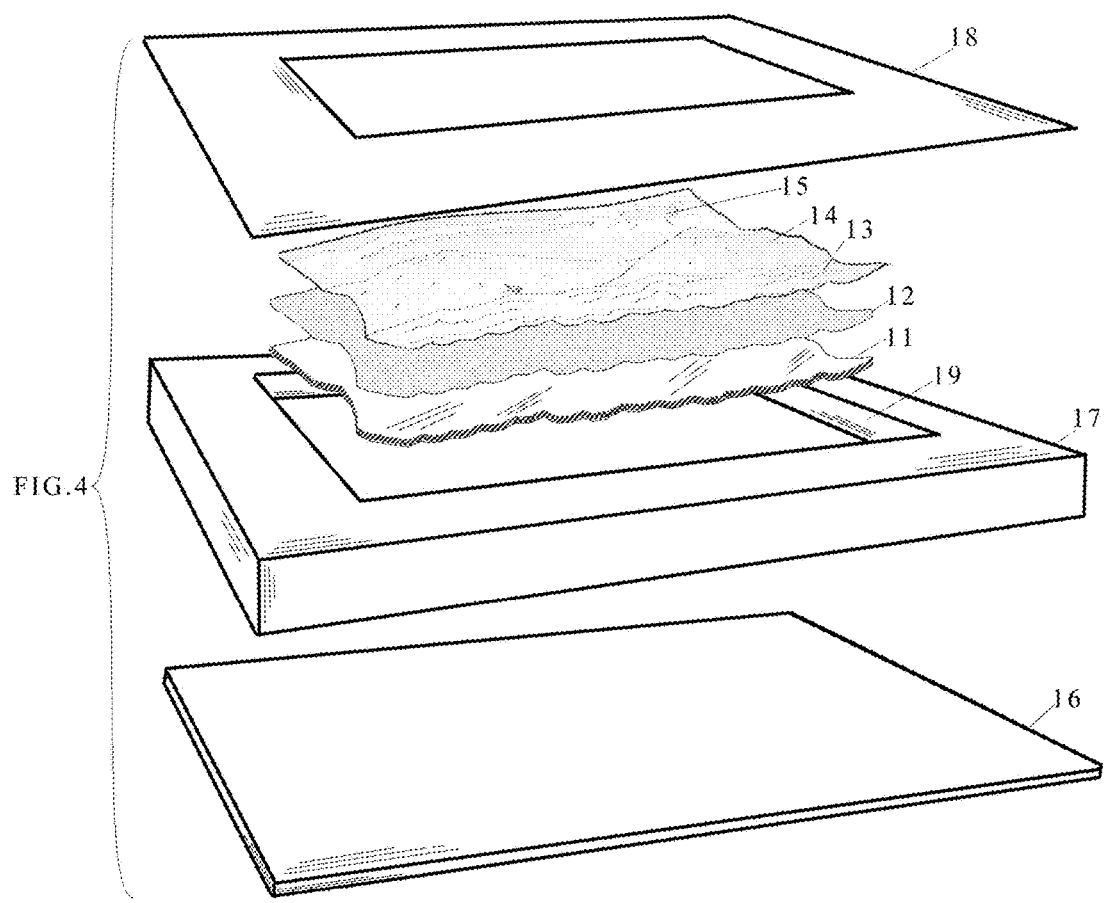

METHOD FOR CREATING A THREE-DIMENSIONAL EFFECT FROM A TWO-DIMENSIONAL WORK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention generally relates to the field of printed art presentation, specifically a method for creating a three-dimensional work out of a two-dimensional work, where the resultant display of said work appears at a distance to be common of a two-dimensional work but upon closer inspection has uncanny depth and realism.

Description of Prior or Related Art

With respect to prior art, there have been other advancements in the presentation of two-dimensional works in a three-dimensional manner. In U.S. Pat. No. 3,868,283, Scheyer focuses on using multiple printed copies of a single photograph. The subject(s) of said copies are cut into different sizes, adhered to multiple backing materials of different thicknesses and layered at uniform and not uniform elevations to enhance three-dimensional realism. The top layer may be bent or sloped to assist in creating the three-dimensional effect. Instead of using a plurality of prints, the present invention focuses on molding a single print to not break the continuity of the image. There is additional realism by not having the distraction of the layers and layered edges integrated with the subject matter and visible to the viewer. The backing material of the present invention is a thin, malleable substrate that the two-dimensional work is either printed onto or adhered to along the backside of the two-dimensional work, allowing the plane of the printed image to then be sculpted into a new form and retain its shape without the need to anchor it to multiple backing materials.

Also in the realm of prior art, two inventions utilized similar materials in order to create their three-dimensional effect. In U.S. Pat. No. 3,694,296 (Frontino), a moldable sheet material is selected, crumpled in a haphazard or irregular manner, and then uncrumpled. An adhesive is applied to the uncrumpled sheet. While moistened by the adhesive, said moldable sheet is worked by hand against a rigid base panel. Once the desired positioning is achieved, the adhesive is permitted to dry and harden. Then, stain, pigment, or other color coatings may be applied to the surface of the dried sheet material before or in conjunction with a protective coating. However, this new patent focuses on bringing additional realism to the subject of the image, altering a printed image such that elements in the subject's foreground are brought closer to the viewer and elements in the subject's background are moved relatively further from the viewer. The image is printed onto paper or a similar image receiving substrate and then adhered to the malleable backing if the image receiving substrate is not already malleable enough to hold its form under gentle pressure. This two-dimensional image is then molded into a shape that compliments the subject matter, adding elevation and depth corresponding with the three dimensions depicted by the image. The foreground subject matter has a purposeful elevation from the original plane, where a crumple or molding not in line with the image's perspective would detract from the intention of the three-dimensional realism.

U.S. Pat. No. 3,057,099 (Fruchter) involves the method for creating sculptured three-dimensional figures that can be mounted, arranged, altered, or re-arranged on a planar mounting board in order to form a composite representation. The steps include cutting out shapes from paper that is backed with or adhered to foil. The backing bears the outline of the desired shapes and indicia for fold lines as well as the location of support means. Once the shapes are bent as indicated, a ball of clay is used to attach them to the mounting board. The Fruchter patent relates to a highly educational, creative activity that can be provided as an art kit which a person of any age or skill level can participate in. It provides for guides to be included on the sheet metal so that anyone can achieve the effect desired by the inventor. As opposed to the intention of providing any indicia for additional manipulation, this patent's two-dimensional work is intended to be permanently molded upon completion. Similar to the Scheyer patent, the Fruchter patent utilizes a plurality of images whereas this patent involves a single print on a malleable backing that is secured by partial enclosure into a cavity. In the present invention, a malleably backed print is secured without the use of clay but rather by bounding the edges and corners as necessary with a thin substrate, such as tape and paper, to prevent it from falling out of the cavity. Additional reinforcement in and around the cavity is applied as necessary to prevent the print from rocking back and forth, although tension against the interior of the cavity the work is placed into may suffice.

Other and further objects, benefits, and advantages will become apparent from a consideration of the ensuing description, summary, and drawings of this invention.

BRIEF SUMMARY OF THE INVENTION

This is the method for producing a three-dimensional effect from a two-dimensional work of art, such that the additional dimension and presentation enhances the realism of the subject matter. The image is adhered to a malleable substrate and then its planar surface is formed into a non-planar surface where the elevation differences accentuate the three-dimensional appearance of the image subject matter. The result is housed in a cavity built to support the permanence of the new shape and disguise it as a common two-dimensional work that can be framed. Upon completion, this process makes a photograph, drawing, graphic or other similar image appear uncannily three-dimensional compared to a flat presentation of the same work, which enables the viewer to see the dimensions akin to a stereographic image without the need for stereographic glasses.

BRIEF DESCRIPTION OF THE DRAWINGS

FIG. 1 is an example two-dimensional work, depicting a lake house at the foot of a mountain scene, that the new process defined could be applied to.

FIG. 4 is an exploded view of FIG. 3.

DETAILED DESCRIPTION OF THE INVENTION

Figure 1:
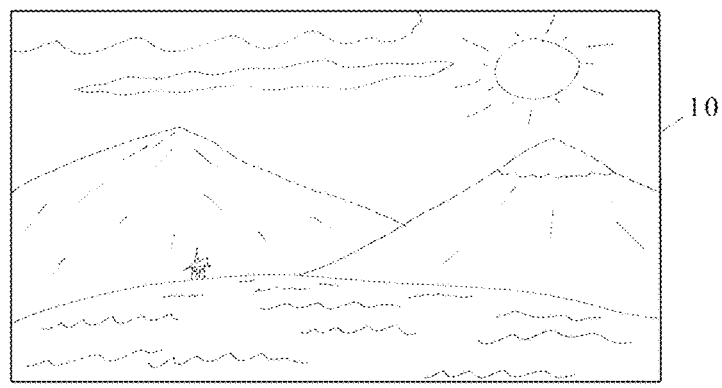

The method for the creation of a three-dimensional effect from a two-dimensional work of art begins with the selection of an image. The two-dimensional work must first be bonded onto a malleable substrate, which may either be done by printing directly onto the substrate itself or by using an additional substrate, such as first printing the image onto paper or canvas and then adhering that substrate onto a malleable substrate. For this particular embodiment, as shown in FIG. 1, a 10 printed scenic photograph of a lake house at the base of a mountain has been selected. The particular subject matter is of little significance except that it provides subject matter for which the present invention may be described. Similarly, the selection of a specific artistic medium is also of little significance as long as distinct foreground and background elements of subject matter are present in the work, thus a drawing, painting, photograph, print or any reproduction thereof equally suffices.

A 11 malleable substrate reinforces the two-dimensional work when sculpted to more durably maintain the new shape. Sculpting involves the manipulation of the original work into three dimensions through means of, but not limited to, bending, embossing, curling, or a combination thereof. The malleable substrate is a flat, thin pliable medium, such as, but not limited to, aluminum sheet metal or aluminum composite, which can be sculpted into a new shape and then retain its shape against gentle pressure. The malleable substrate length and width chosen is similar to or matches the dimensions of the two-dimensional work allowing the sculpting of the malleable substrate to directly control the sculpting of the printed image that it is adhered to. In this particular embodiment, an 12 adhesive sheet, able to adhere on both sides, is used to bond the two-dimensional work onto the malleable substrate. In this particular embodiment, the edges of the two-dimensional work and the malleable substrate are the same length. However, the dimensions of the malleable substrate are not required to conform precisely to the dimensions of the two-dimensional work as long as the sculpting of the malleable substrate can properly influence and control the transformation of the printed image into three dimensions.

Figure 2:
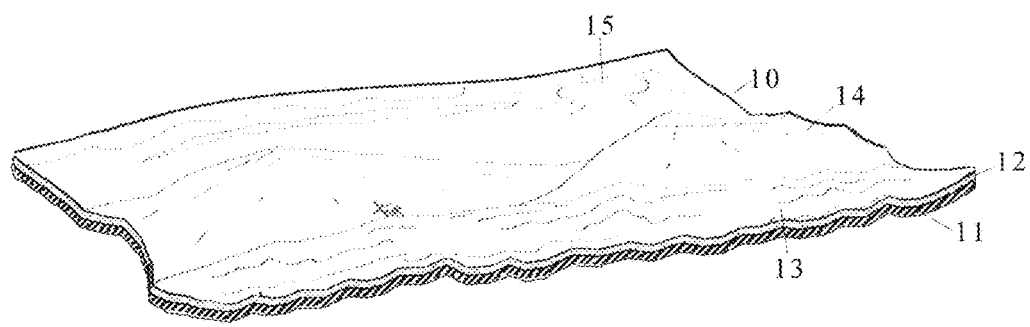
FIG. 2 is an example of a two-dimensional work in perspective that has been adhered to a malleable substrate and sculpted into three dimensions, thus creating a work piece.

Once the two-dimensional work is backed by the malleable substrate, it is now a work piece ready for sculpting. The work piece is sculpted from its planar shape into a new three-dimensional geometry based on the contours and shapes depicted by the image, as shown in FIG. 2. In this embodiment, the 13 lake has been angled toward the viewer, such that the bottom edge of the work is closest when the work as a whole is viewed perpendicularly to the subject matter. Similarly, the 14 mountains have been molded to an elevation closer to the viewer than the 15 sun and clouds, but not as close as the bottom edge of the lake. This sculpting can be done by free-hand manipulation or by the use of a shape or mold positioned above or underneath the two-dimensional work, which it is pressed upon, or a combination thereof. Additionally, bumps are molded into the position of the waves on the lake to give even the subtlest detail three-dimensional elevation.

Figure 3:
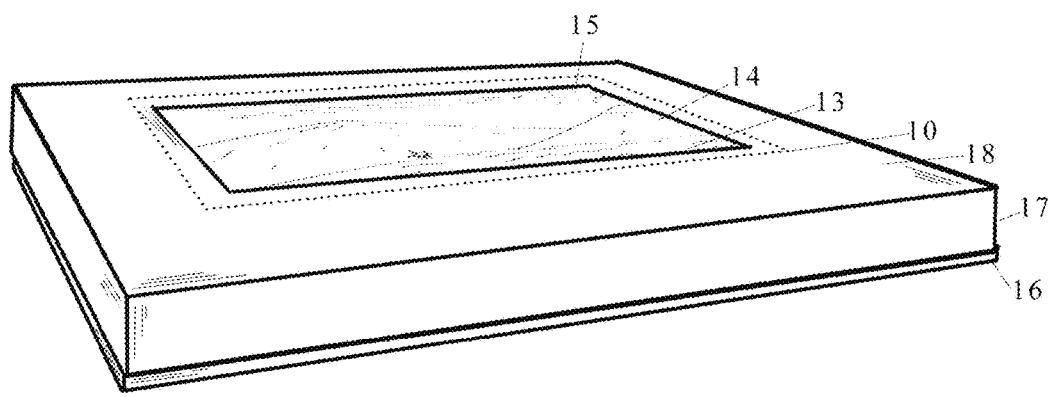
FIG. 3 is a view in perspective showing an embodiment of the finished process as applied to the two-dimensional work.

The sculpted work piece, as shown in FIG. 3, is housed within an enclosure comprised of a 16 rigid backing material, a 17 rigid framing material with a cavity allowing the sculpted work piece to rest within, and a 18 rigid top material with an opening to view the work. For this particular embodiment, the rigid backing material is made of one-eighth inch foam board, but could be any number of planar materials, such as, but not limited to, cardboard, aluminum composite, or wood. For this particular embodiment, the rigid framing material is made of half inch foam board, but could also be any number of planar materials, such as, but not limited to, cardboard, aluminum composite, or wood. As shown in FIG. 4, a 19 cavity has been created in the rigid framing material by cutting out a portion of the interior. The cavity can either be subtracted out of the rigid framing material or assembled using a plurality of rigid materials. The interior of the cavity is large enough to fit the work piece in all three dimensions, allowing said image to be anchored to it with adhesive tape or trapped inside of the cavity. For this particular embodiment, the work piece will rest snuggly in the cavity, but it could be anchored within the cavity utilizing an adhesive or tape, or it could be trapped by obstructing the edges or corners with a thin material that is later obscured by the rigid top material. The purpose of the rigid framing material and cavity is two-fold. First, it prevents any future glazing from framing the art work from pressing directly onto the work piece when framed. Second, it is used to preserve the work piece shape by conforming to the edges of the work piece. The 17 rigid framing material is then stacked on top of and in alignment with the 16 rigid backing material as shown in FIG. 3, and the work piece is placed in the cavity.

Once the work piece is secured within the cavity, either by anchors, traps, tension of the work piece against the inside of the cavity, or by no means at all, a 18 rigid top material with an opening narrower than the work piece is stacked atop the rigid framing material in alignment with the materials below it as shown in FIG. 3. In this particular embodiment, the rigid top material is a paper window mat with an interior opening length and width smaller than the work piece each by an inch, and an exterior length and width matching that of the rigid framing material layer below. The purpose of the rigid top material is to obscure the edges of the work piece to discourage the understanding of how the subject matter of the work piece appears uncannily three-dimensional given how similar the work as a whole appears to be a commonly matted two-dimensional work from afar. This allows the image to be viewed non-perpendicularly where viewing the gap between the window mat and sculpted image reveals more of the sculpted image to be seen rather than exposing the rigid framing material or edge of the work piece.

While the above description contains much specificity, it should not be construed as a limitation on the scope of the invention, but rather an exemplification of one preferred embodiment thereof. Any two-dimensional work may be used, this invention is not limited to the printed lake house photograph that is included in the drawings. Many other variations are possible. Any size or shape two-dimensional work can be used, including, but not limited to rectangular, round, or asymmetrical dimensions.

Accordingly, the scope of the invention should be determined not by the embodiments illustrated, but by the appended claims and their legal equivalents.

I claim:

1. The method for producing a three-dimensional effect from a single two-dimensional work, comprising the steps of:
    providing a single two-dimensional work depicting subject matter with foreground and background elements;
    providing a malleable backing substrate of approximate dimensions of said two-dimensional work, which is able to be sculpted, yet retain its shape when bonded to said two-dimensional work;
    bonding said malleable backing substrate to the side of said two-dimensional work opposite of said subject matter, forming a work piece;
    sculpting said work piece into a new topography, giving depicted foreground subject matter elements raised elevation relative to the depicted background subject matter elements, thereby bringing said work piece into a three-dimensional work based on said depicted spacial relationship of said elements of said subject matter;
    providing a rigid backing material that is planar and has a greater length and width than said work piece;
    providing a rigid framing material that is planar and has a length and width approximately matching said rigid backing material and a depth approximately matching the depth of said work piece, wherein a cavity exists approximately matching the width, length and depth of said work piece, such that said work piece fits inside of said cavity while allowing said subject matter of said work piece to remain visible;
    providing a rigid top material that is planar and has a length and width approximately matching that of said rigid backing material, wherein an opening within said rigid top material exists with a width and length less than that of said work piece such that said subject matter of said work piece remains mostly visible when viewed through the opening when said rigid top material is placed atop and centered over said work piece and wherein the edges of said work piece are not visible from a perpendicular view of said work piece when viewed through said opening of said rigid top material;
    stacking said rigid framing material atop said rigid backing material in alignment with the matching length and width of both materials;
    placing said work piece subject matter side up into said cavity of said rigid framing material such that it rests atop said rigid backing material;
    stacking said rigid top material atop said rigid framing material in alignment with the matching length and width of both materials, thereby sandwiching said work piece and said rigid framing material between said rigid backing material and said rigid top material creating an enclosure to house said work piece.

2. The method of claim 1 wherein said cavity of said rigid framing material is created by means of subtraction of material from a unitary rigid material.

3. The method of claim 1 wherein said cavity of said rigid framing material is created by means of casting said rigid framing material from a mold.

4. The method of claim 1 wherein said rigid framing material is comprised of a plurality of rigid materials arranged to form said cavity.

5. The method of claim 1 further comprising adhering said work piece to said rigid backing material.

6. The method of claim 1 further comprising adhering said work piece to said rigid framing material.

7. The method of claim 1 further comprising adhering said work piece to said rigid top material.

8. The method of claim 1 further comprising adhering said rigid backing material to said rigid framing material.

9. The method of claim 1 further comprising adhering said rigid framing material to said rigid top material.

* * * * *